(12) United States Patent
Chen et al.

(10) Patent No.: US 6,604,861 B2
(45) Date of Patent: Aug. 12, 2003

(54) CABLE MANAGEMENT SYSTEM FOR FIBER OPTIC CONNECTOR ASSEMBLIES

(75) Inventors: Wenzong Chen, Naperville, IL (US); Igor Grois, Northbrook, IL (US); Jeffrey A. Matasek, Cedarburg, WI (US); B. Daniel Szilagyi, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/109,259

(22) Filed: Mar. 28, 2002

(65) Prior Publication Data

US 2002/0114581 A1 Aug. 22, 2002

(51) Int. Cl.[7] .................................................. G02B 6/38
(52) U.S. Cl. ......................................... 385/56; 439/942
(58) Field of Search ............................. 385/55, 56, 58, 385/59, 62, 65, 76, 81, 71; 439/456, 470, 942

(56) References Cited

U.S. PATENT DOCUMENTS

| | | | |
|---|---|---|---|
| 5,530,787 A | * 6/1996 | Arnett ........................ 385/137 |
| 6,203,362 B1 | * 3/2001 | Tsuji ........................... 439/470 |
| 6,457,872 B1 | * 10/2002 | Besler ........................... 385/56 |
| 6,461,052 B1 | * 10/2002 | Hines et al. .................. 385/53 |
| 2001/0043775 A1 | * 11/2001 | Shirakawa et al. ........... 385/59 |
| 2003/0007744 A1 | * 1/2003 | Ngo ............................. 385/86 |

* cited by examiner

*Primary Examiner*—Tulsidas Patel
*Assistant Examiner*—Hae Moon Hyeon
(74) *Attorney, Agent, or Firm*—A. A. Tirva

(57) ABSTRACT

A cable management system is provided for a fiber optic connector assembly. The system includes a receptacle and a plurality of fiber optic connector modules received by the receptacle. The modules terminate a plurality of fiber optic cables with lengths of the cables extending away from the rear ends of the modules. A cable management member has an angled cavity within which the cables extend angularly from the rear ends of the modules. Latches are provided between the cable management member and each of the plurality of modules for holding the cable management member in position at the rear ends of the modules.

22 Claims, 7 Drawing Sheets

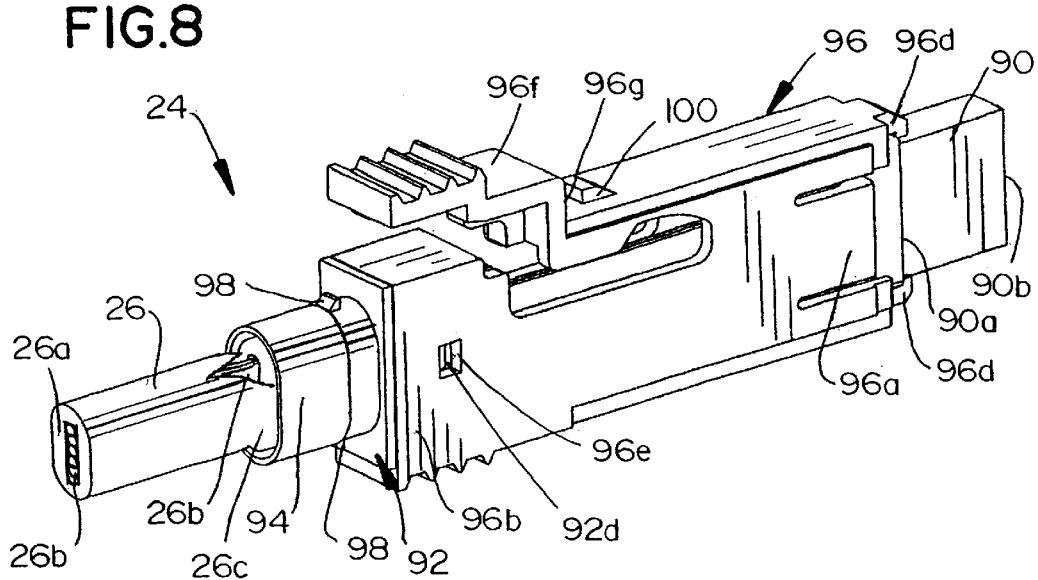
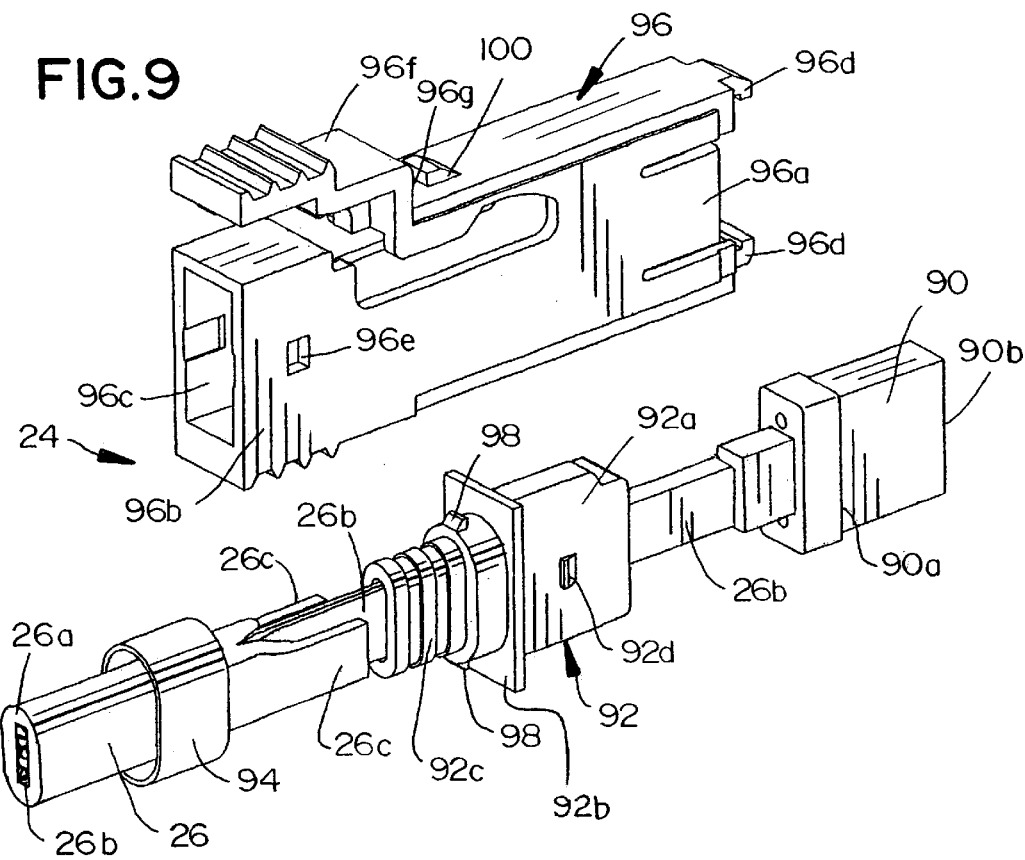

CABLE MANAGEMENT SYSTEM FOR FIBER OPTIC CONNECTOR ASSEMBLIES

FIELD OF THE INVENTION

This invention generally relates to the art of connector assemblies, such as fiber optic connector assemblies, and particularly to a cable management system for such connector assemblies.

BACKGROUND OF THE INVENTION

A connector assembly, such as a fiber optic connector assembly, typically includes some form of housing which mates with a complementary mating connector such as an optical fiber transmission device. The connector housing may terminate a plurality of cables which are to be interconnected with the complementary mating connector. For instance, the housing may include a plurality of passages for receiving ferrules terminated to the fiber cores of fiber optic cables.

The housings of such connector assemblies as described above typically include a rear face from which the cables emanate. With the ever-increasing miniaturization of the electronics and fiber optics in various industries, along with the accompanying miniaturization of connector assemblies as described above, considerable problems have been encountered in handling or managing the small cables which emanate from the connector housings. This is particularly true with angled connectors where the cables exit the rear face of a connector housing and extend at an angle, such as a right-angle away from the housing. Still further, a plurality of fiber optic cables often are terminated in a plurality of modules which are inserted into a connecting device which often is called an adapter. Such designs heretofore tend to be unduly complicated and expensive and increase the problems encountered in handling or managing the cables which emanate from the individual connector modules. The present invention is directed to solving these problems by providing a unique cable management system for such connector assemblies.

SUMMARY OF THE INVENTION

An object, therefore, of the invention is to provide a new and improved cable management system particularly for use in a fiber optic connector assembly. In the exemplary embodiment of the invention, the system includes a receptacle and a plurality of fiber optic connector modules received by the receptacle. The connector modules terminate a plurality of fiber optic cables, with lengths of the cables extending away from rear ends of the modules. A cable management member is provided with an angled cavity within which the cables extend angularly from the rear ends of the connector modules. Complementary interengaging latch means are provided between the cable management member and each of the plurality of fiber optic connector modules for holding the cable management member in position at the rear ends of the modules.

According to one aspect of the invention, the angled cavity of the cable management member is divided into a plurality of separate angled channels for individually receiving the plurality of fiber optic cables. The angled channels are arranged in a side-by-side relationship, and the channels herein are at right-angles to the rear ends of the fiber optic connector modules.

According to another aspect of the invention, the cable management member includes a base part and a cover part. The base part has the angled cavity therein, and the cover part clamps to the base part with the cables in the cavity. The complementary interengaging latch means are provided between the fiber optic connector modules and both the base part and the cover part of the cable management member. Complementary interengaging second latch means are provided between the base part and the cover part to hold the parts together clamping the rear ends of the fiber optic connector modules and the cables therebetween. In the preferred embodiment, the cover part is connected to the base part by an integral living hinge.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 8 is a perspective view of one of the fiber optic connector modules of the backplane connector assembly to which the cable management member is to be mounted; and FIG. 9 is an exploded perspective view of the connector module of FIG. 8.

DETAILED DESCRIPTION OF THE PREFERRED EMBODIMENT

Figure 1:
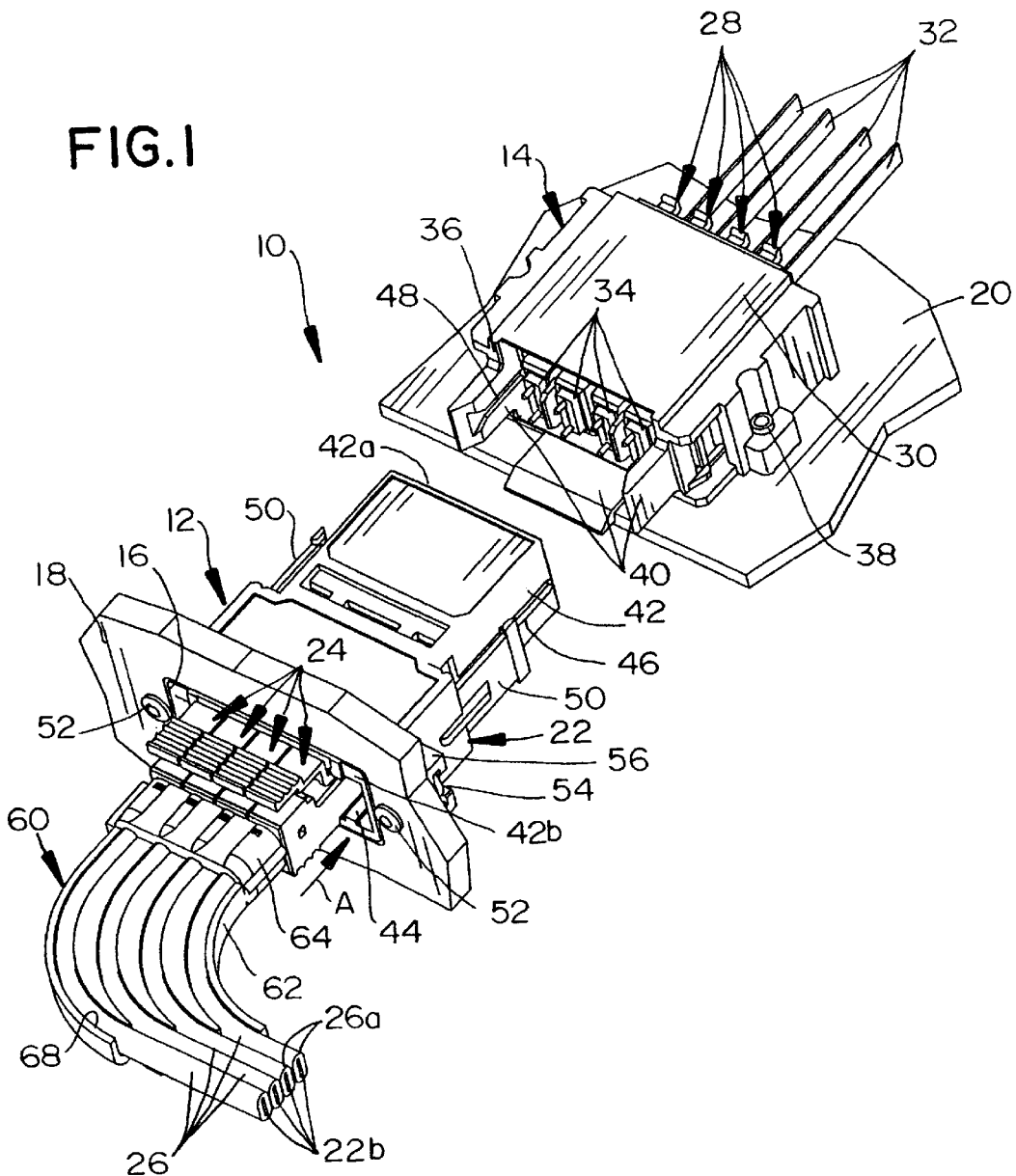
FIG. 1 is a top perspective view of a mating connector assembly incorporating a cable management system according to the invention, with the assembly in unmated condition.
Figure 2:
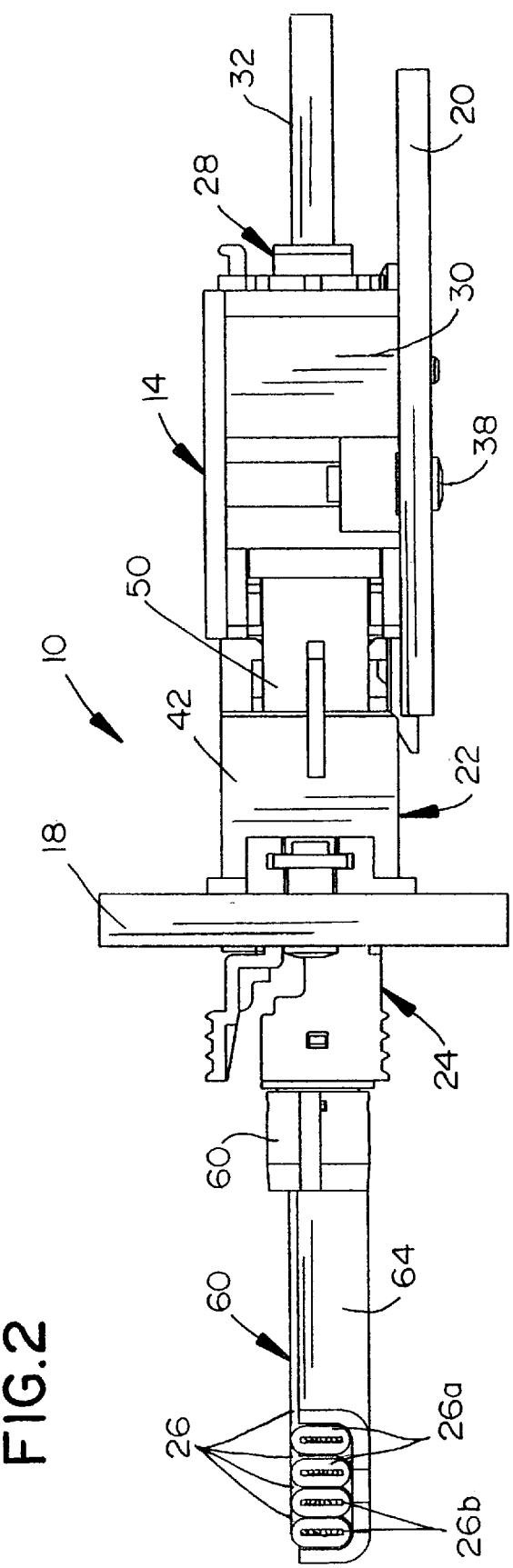
FIG. 2 is a side elevational view of the connector assembly of FIG. 1, in mated condition.
Figure 3:
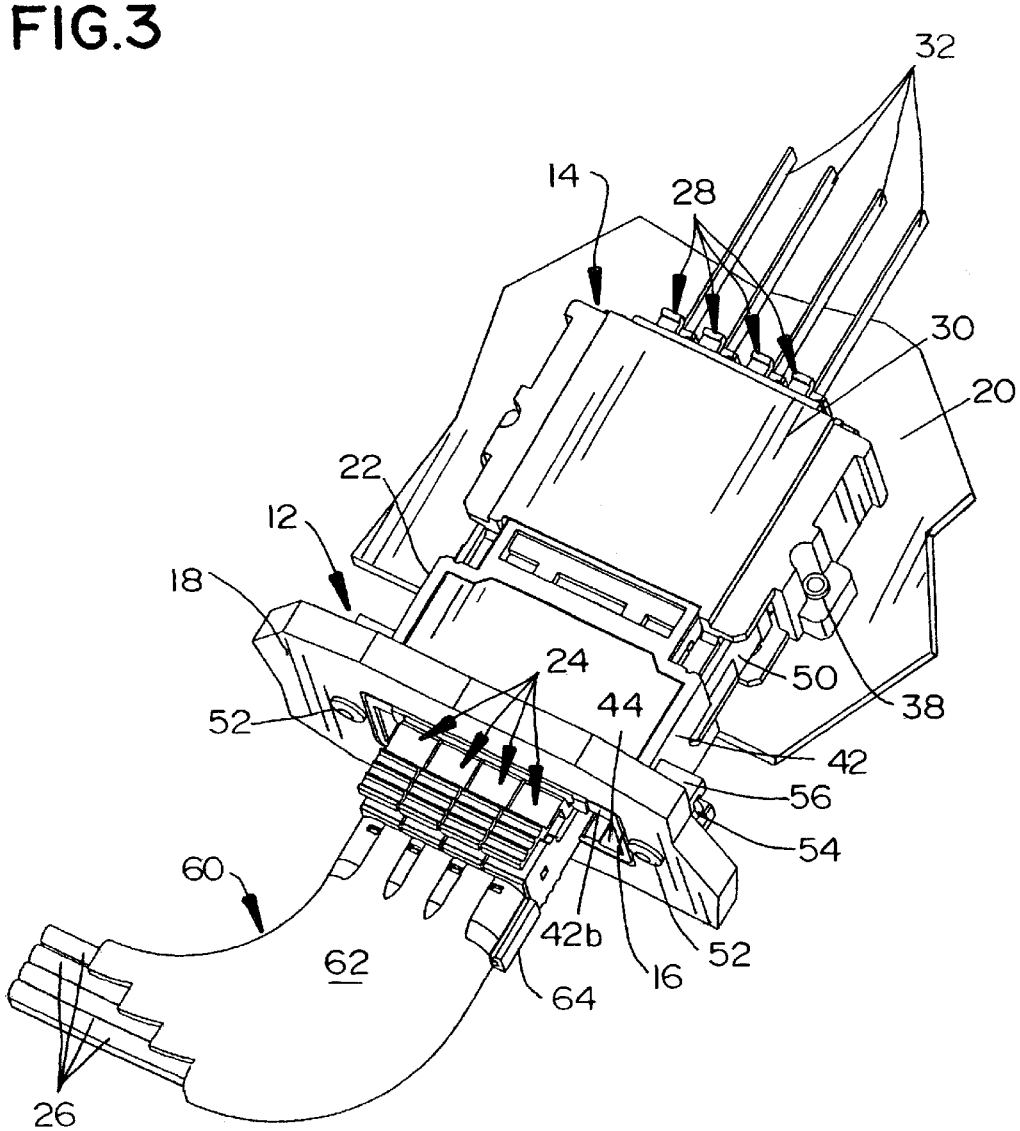
FIG. 3 is a bottom perspective view of the connector assembly, in mated condition.

Referring to the drawings in greater detail, and first to FIGS. 1–3, the invention is embodied in a mating connector assembly, generally designated 10, which includes a backplane connector assembly, generally designated 12, mateable with a daughtercard connector assembly, generally designated 14. The backplane connector assembly is mounted in an aperture 16 in a substrate, panel or backplane 18 which, in the preferred embodiment, is a printed circuit board. Specifically, backplane 18 can be considered the "motherboard" herein. The daughtercard connector assembly is mounted on a top surface of a second printed circuit board 20 which is considered the "daughtercard" herein.

Backplane connector assembly 12 includes an adapter, generally designated 22, which is mounted in aperture 16 in motherboard 18. Four fiber optic connector modules, generally designated 24, are inserted into adapter 22, through aperture 16, from the front of backplane 18. Each fiber optic connector module is terminated to a multi-fiber cable 26. Each cable 26 includes an outer jacket 26a surrounding a flat "ribbon" 26b having a plurality of optical fibers.

After daughtercard connector assembly 14 is mounted on daughtercard 20, four fiber optic connector modules, generally designated 28, are inserted into the back of a connector housing 30. Each module 28 is terminated to a flat, multi-fiber cable 32 which is a "bare" fiber optic cable in that it does not include an outer jacket as with multi-fiber cables 26. The fibers of cables 32 are terminated in ferrules 34, with mating ends of the ferrules and fibers exposed at a mating end 36 of connector housing 30. The connector housing is secured to daughtercard 20 by appropriate fasteners 38. A plurality of guides 40 project forwardly of connector housing 30 to facilitate mating the housing with adapter 22 of backplane connector assembly 12.

Adapter 22 of backplane connector assembly 12 includes a housing 42 which may be fabricated of molded plastic material. The housing defines a front mating end 42a and a rear terminating end 42b. The terminating end is open to define a receptacle 44 for receiving connector modules 24 in the direction of arrow "A" (FIG. 1). Housing 42 of adapter 22 has an outwardly projecting alignment rib 46 on each opposite side thereof and extending in the mating direction of the connector assembly for riding in slots 48 (FIG. 1), of side guides 40 of daughtercard connector housing 30. A pair of flexible, cantilevered latch arms 50 are provided on opposite sides of housing 42 for interengagement with complementary latch means (not visible in the drawings) within daughtercard connector housing 30. A pair of fasteners 52 extend through holes in backplane 18 and into a pair of fastener nuts 54 seated in a flange 56 of housing 42 to provide attachment of adapter 22 to the backplane while allowing the adapter to float relative to the backplane, with mating end 42b extending into aperture 16 in the backplane as seen in FIGS. 1 and 3.

Figure 4:
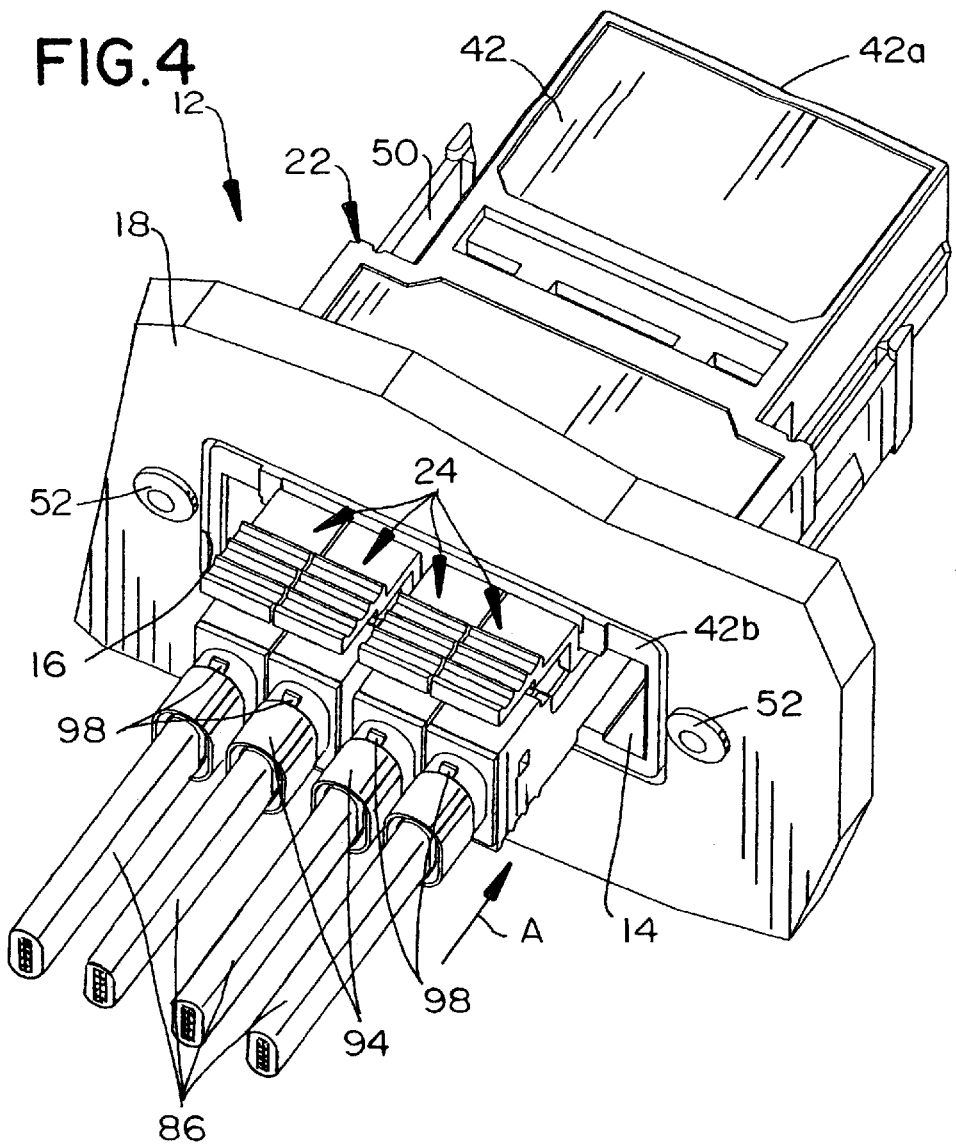
FIG. 4 is a top perspective view of the backplane connector assembly as seen to the left in FIGS. 1–3, with the cable management member removed.
Figure 5:
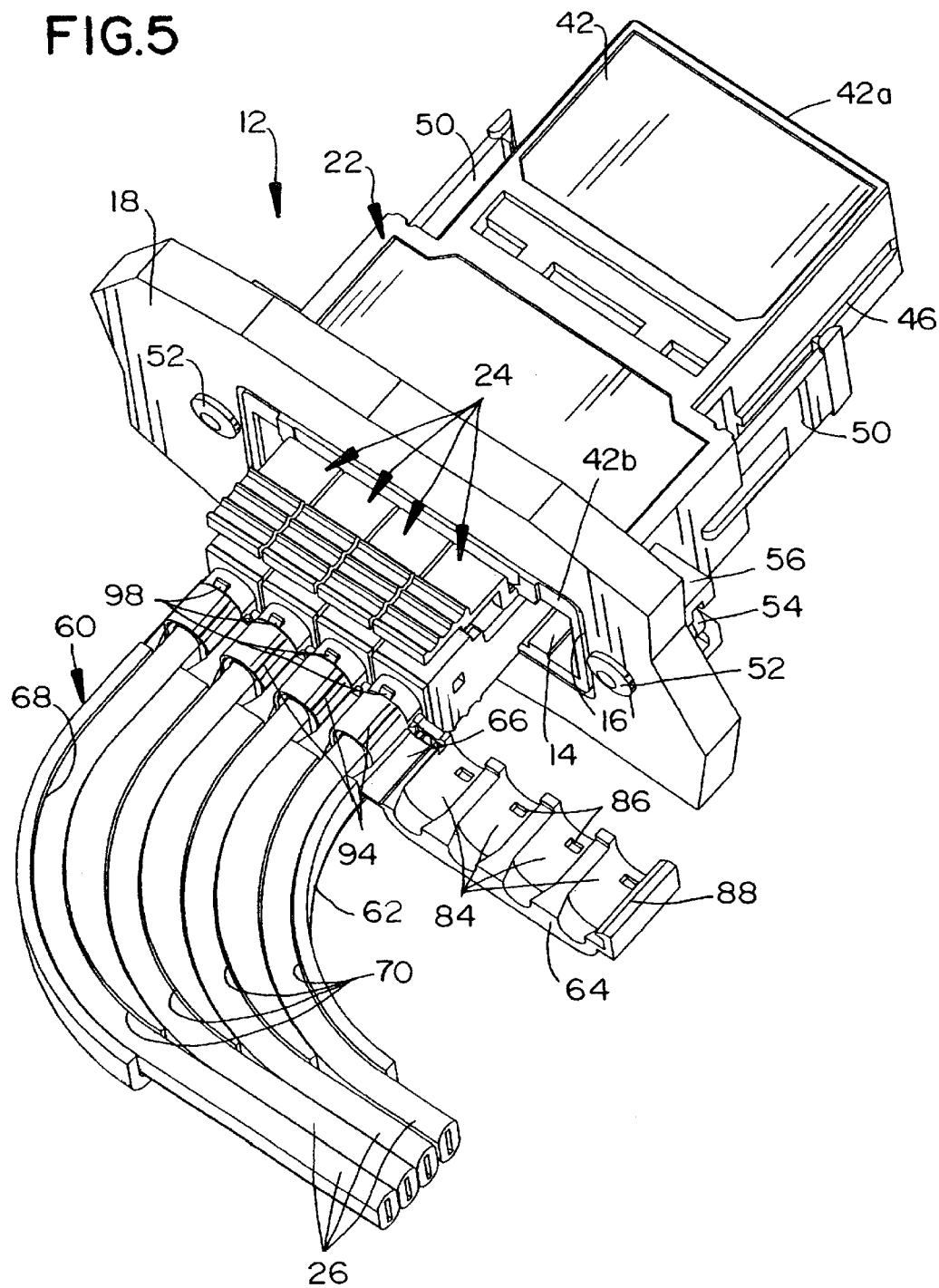
FIG. 5 is a view similar to that of FIG. 4, with the cable management member installed but not fully clamped as seen in FIGS. 1–3.

After backplane connector assembly 12 is secured to backplane 18 and connector modules 24 are inserted into receptacle 44, a cable management member, generally designated 60, is clamped about the rear ends of fiber optic connector modules 24 and about cables 26 to neatly align the cables in a right-angled arrangement as seen in FIGS. 1–3. FIG. 4 shows fiber optic cables 26 emanating from the rear ends of fiber optic connector modules 24 before the installation of cable management member 60. FIG. 5 shows cable management member 60 in an open condition with cables 26 neatly arranged in a right-angled side-by-side managed array before the cable management member is closed.

Figure 6:
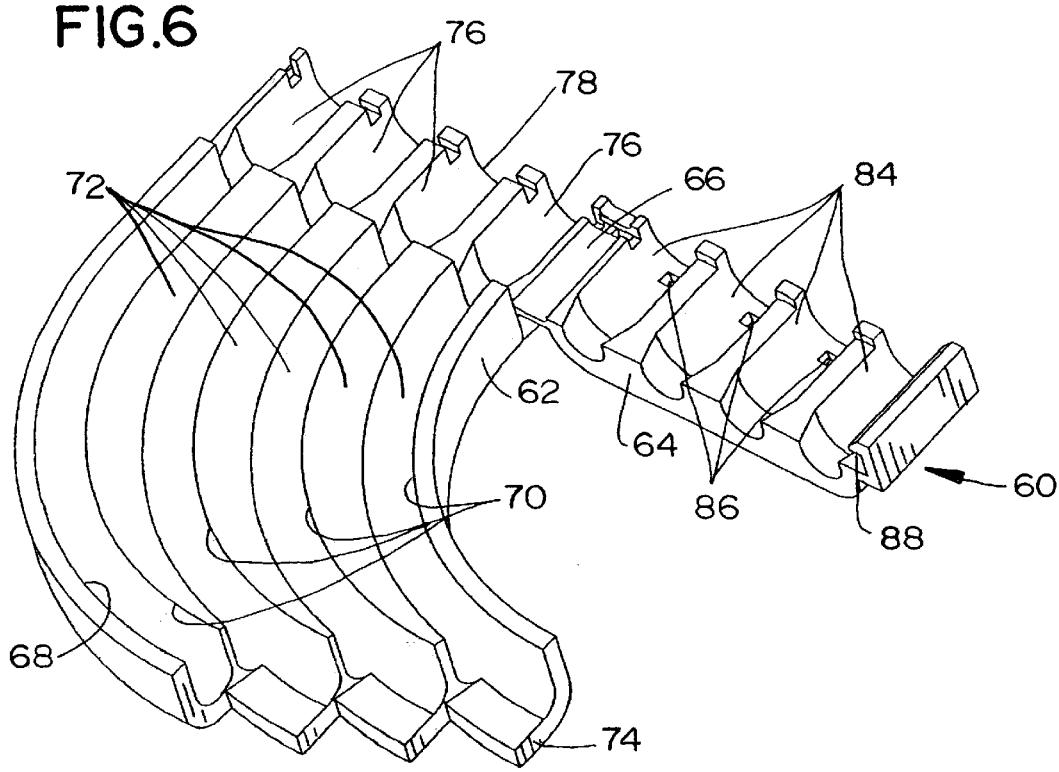
FIG. 6 is a top perspective view of the cable management member in open condition.
Figure 7:
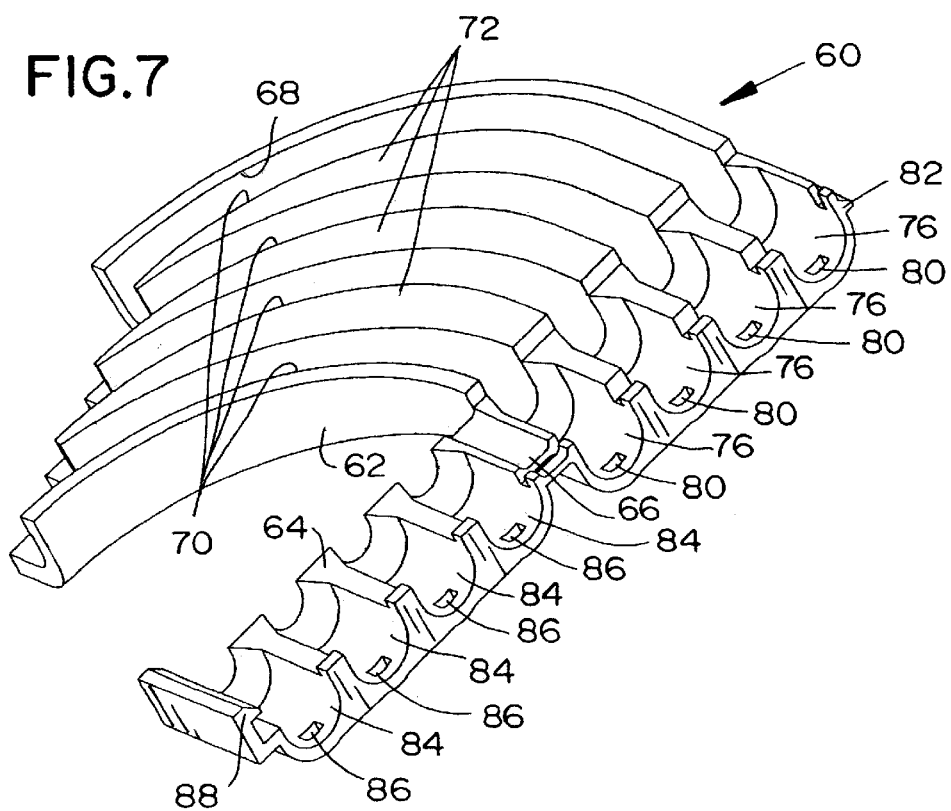
FIG. 7 is a view similar to that of FIG. 6, but looking at the front face of the cable management member.

With the above understanding of the general operation of cable management member 60, reference now is made to FIGS. 6 and 7 which show the cable management member in detail. Specifically, the cable management member includes two parts, namely a base part 62 and a cover part 64. The cable management member can be easily molded of dielectric material such as plastic or the like. In the preferred embodiment, cable management member 60 is a unitary or one-piece structure, with cover part 64 integrally joined to base part 62 by an integrally molded living hinge or web 66. Therefore, the cover part can be pivoted about the living hinge from its open condition shown in FIGS. 5–7 to its closed or clamping position shown in FIGS. 1–3.

Base part 62 of cable management member 60 includes a right-angled cavity 68 which is divided into a plurality of separate right-angled channels 70 by a plurality of partitions 72. Channels 70 curve from a rear end 74 of base part 62 to and in communication with a corresponding plurality of semi-cylindrical cavities 76 which open at a front face 78 of the base part. As best in seen in FIG. 7, a latch aperture 80 is formed in the bottom of each semi-cylindrical cavity 76. FIG. 7 also shows that a latching flange 82 projects outwardly from the base part at a side thereof opposite cover part 64.

Still referring to FIGS. 6 and 7, cover part 64 of cable management member 60 includes a plurality of semi-cylindrical cavities 84 which correspond in number with the semi-cylindrical cavities 76 in base part 62. Each cavity 84 of the cover part includes a latch aperture 86 in the bottom of the cavity. Finally, an inwardly directed, chamfered latching flange 88 is formed at the distal end of cover part 64.

When cover part 64 of cable management member 60 is pivoted about hinge 66 from its open position shown in FIGS. 5–7 to its closed position shown in FIGS. 1–3, semi-cylindrical cavities 84 in the cover part align with semi-cylindrical cavities 76 in base part 62 to embrace or surround the rear ends of fiber optic connector modules 24 as well as the terminating ends of cables 26. When in closed condition, the cable management member is latched or locked to the fiber optic connector modules as will be described below.

FIGS. 8 and 9 show an individual one of the fiber optic connector modules 24. As stated above, each module terminates a multi-fiber optic cable 26. The cable includes the multi-fiber ribbon 26b surrounded by strength members (not shown) and outer jacket 26a. The outer jacket of each cable 26 is stripped to expose fiber ribbon 26b as seen in FIG. 9, leaving jacket ends 26c. A ferrule 90 terminates the ends of the individual fibers, and the ferrule has a peripheral stop shoulder 90a which faces a forward mating end 90b of the ferrule.

Still referring to FIGS. 8 and 9 and particularly FIG. 9, fiber optic connector module 24 further includes a fixing body, generally designated 92, along with a crimp ring 94 and a housing, generally designated 96. Fixing body 92 includes a front end 92a in front of an outwardly projecting rectangular flange 92b. An oblong crimp section 92c projects rearwardly of flange 92b. A pair of chamfered latch bosses 92d are formed on opposite sides of front end 92a. A pair of ramped or chamfered latch bosses 98 are provided at the top and bottom of crimp section 92c. The entire fixing body is a one-piece structure which may be molded of plastic material or die cast of zinc alloys.

Crimp ring 94 of connector module 24 is oblong in shape and is sized to fit over crimp section 92c of fixing body 92, with jacket ends 26c and strength members (not shown) positioned between the crimp section and the crimp ring. The ring is fabricated of deformable material, such as metal, for clamping the jacket ends and strength members to the crimp section as seen in FIG. 8.

Housing 96 of connector module 24 includes a front portion 96a within which ferrule 90 is mounted and a rear portion 96b within which fixing body 92 is mounted. The front portion is open and through which mating end 90b of the ferrule is exposed along with the exposed ends of the fibers. The rear portion has an open rear end 96c through which the rear end of the fixing body and latches 98 are exposed as seen in FIG. 8. A pair of stop hooks 96d at the front of housing 96 are directed inwardly for engaging stop shoulders 90a of ferrule 90. A pair of latch apertures 96e are formed in opposite sides of the housing, in rear portion 96b, for engaging latch bosses 92d on opposite sides of fixing body 92. An upwardly stepped latch arm 96f is formed at the top of the housing and a ramped latch boss 100 is spaced from a shoulder 96g. The shoulder abuts against rear terminating end 42b (FIG. 1) of adapter housing 42, and latch bosses 100 interengage within latch apertures (not visible in the drawings) of the adapter housing.

In assembly of each fiber optic connector module 24 as described above in relation to FIGS. 8 and 9, ferrule 90 is terminated to fiber ribbon 26b and crimp ring 94 is crimped onto crimp section 92c of fixing member 92 sandwiching the strength members and jacket ends 26c therebetween. This subassembly then is inserted into open rear end 96c of housing 96 until stop hooks 96d engage stop shoulders 90a of ferrule 90 and latch bosses 92d of fixing member 92 snap into latch apertures 96e of housing 96. In the full assembly of fiber optic connector module 24 as seen in FIG. 8, it should be noted that chamfered latch bosses 98 at the rear end of fixing body 92 are exposed outside the rear end 96b of housing 96.

After adapter 22 is mounted in aperture 16 of backplane 18 as described above and shown in FIG. 4, four of the fiber optic connector modules 24 are inserted in the direction of arrow "A" into receptacle 44 of the adapter as seen in FIG. 4. Fiber optic cables 26 project rearwardly from the modules, as shown. Base part 62 of cable management member 60 then is brought into position beneath the rear ends of fiber optic connector modules 24 as seen in FIG. 5. Crimp rings 94 of the modules are seated into semi-cylindrical cavities 76 (FIGS. 6 and 7) of the base part of the cable management member. When this is done, the bottom latch bosses 98 (FIG. 9) of the connector modules are positioned into latch apertures 80 (FIG. 7) within cavities 76. Cables 26 are bent and positioned within right-angled channels 70 of the base part as shown in FIG. 5. Cover part 64 then is pivoted about integrally molded living hinge 60 and is closed onto the top of the rear ends of fiber optic connector modules 24, particularly over the top of crimp rings 94. The cover part is securely latched to the base part by the interengagement of latching flanges 82 and 88 described in relation to FIGS. 6 and 7. Finally, latch bosses 98 (FIG. 9) at the tops of fixing bodies 92 which are exposed as seen in FIGS. 4 and 8, become interengaged within latch apertures 86 in cover part 64. Therefore, when cover part 64 is completely closed and latched onto base part 62 to close cable management member 60, both the cover part and the base part are independently latched to the rear ends of fiber optic connector modules 24 by the interengagement of latch bosses 98 in latch apertures 80 of the base part and latch apertures 86 of the cover part. Cables 26 do not ride out of angled channels 70 because the cables are "stiffened" in the planar direction of the flat fiber ribbons 26b.

An alternative procedure to position and attach cable management member 60 to fiber optic connector modules 24 is to attach the cable management member 60 to the modules 24 before the modules 24 are inserted into receptacle 44 of the adapter 22. After the cable management member 60 is attached to the required number of modules 24, the modules 24 along with cable management member 60 are inserted into receptacle 44.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable management system in a fiber optic connector assembly, comprising:
   a receptacle;
   a plurality of fiber optic connector modules received by the receptacle, the connector modules terminating a plurality of fiber optic cables with lengths of the cables extending away from rear ends of the connector modules;
   a single cable management member having a plurality of separate angled channels for individually receiving the plurality of fiber optic cables and within which the cables extend angularly from the rear ends of the connector modules; and
   complementary interengaging latch means between the single cable management member and at least one of the plurality of fiber optic connector modules for holding the cable management member in position at the rear ends of the modules.

2. The cable management system of claim 1 wherein said angled channels are arranged in a side-by-side relationship.

3. The cable management system of claim 2 wherein said channels are at right-angles to the rear ends of the fiber optic connector modules.

4. The cable management system of claim 1 wherein said cable management member includes a base part and a cover part, the base part having said angled channels, and the cover part clamping the cables in the channels.

5. The cable management system of claim 4 wherein at least part of said complementary interengaging latch means is provided between the fiber optic connector modules and said base part of the cable management member.

6. The cable management system of claim 4 wherein at least part of said complementary interengaging latch means is provided between the fiber optic connector modules and said cover part of the cable management member.

7. The cable management system of claim 4, including complementary interengaging second latch means between the base part and the cover part of the cable management member to hold the cover part to the base part.

8. The cable management system of claim 7 wherein said cover part is connected to the base part by an integral living hinge.

9. The cable management system of claim 1 wherein said cable management member includes a base portion and a clamping portion for clamping the rear ends of the fiber optic connector modules therebetween.

10. The cable management system of claim 9 wherein at least part of said complementary interengaging latch means is provided between the fiber optic connector modules and said base portion of the cable management member.

11. The cable management system of claim 9 wherein at least part of said complementary interengaging latch means is provided between the fiber optic connector modules and said clamping portion of the cable management member.

12. The cable management system of claim 9 wherein said angled channels are disposed in the base portion of the cable management member.

13. A cable management system in a fiber optic connector assembly, comprising:
   a receptacle;
   a plurality of fiber optic connector modules positioned in a row within the receptacle, the connector modules terminating a plurality of fiber optic cables with lengths of the cables extending away from rear ends of the connector modules;

a single cable management member including a base part and a cover part sandwiching rear ends of the fiber optic connector modules therebetween, at least one of the base part and cover part including a plurality of separate side-by-side right-angled channels for individually receiving the plurality of fiber optic cables extending away from the rear ends of the connector modules; and complementary interengaging latch means between at least one of the parts of the cable management member and at least one of the plurality of fiber optic connector modules for holding the cable management member in position at the rear ends of the modules.

14. The cable management system of claim 13 wherein said complementary interengaging latch means are provided between both the base part and the cover part of the cable management member and each of the plurality of fiber optic connector modules.

15. The cable management system of claim 13, including complementary interengaging second latch means between the base part and the cover part of the cable management member to hold the cover part to the base part.

16. The cable management system of claim 15 wherein said cover part is connected to the base part by an integral living hinge.

17. A cable management apparatus for a plurality of fiber optic connector modules received in a receptacle in a side-by-side array, the modules terminating a plurality of fiber optic cables with lengths of the cables extending away from rear ends of the modules, the apparatus comprising:

a single cable management base having a plurality of separate angled channels for individually receiving the plurality of fiber optic cables and within which the cables extend angularly from the rear ends of the connector modules;

a single cover engageable with the base for clamping the cables therebetween; and complementary interengaging latch means between at least one of the base and the cover and at least one of the plurality of fiber optic connector modules for holding the cable management apparatus in position at the rear ends of the modules.

18. The cable management apparatus of claim 17 wherein said angled channels are arranged in a side-by-side relationship.

19. The cable management apparatus of claim 18 wherein said channels are at right-angles to the rear ends of the fiber optic connector modules.

20. The cable management apparatus of claim 17 wherein said complementary interengaging latch means are provided between both the cable management base and cover and each of the plurality of fiber optic connector modules.

21. The cable management apparatus of claim 17, including complementary interengaging second latch means between the cable management base and the cover to hold the cover to the base.

22. The cable management apparatus of claim 17 wherein said cover is connected to the base by an integral living hinge.

* * * * *